(12) United States Patent
Hawes et al.

(10) Patent No.: US 6,604,724 B2
(45) Date of Patent: Aug. 12, 2003

(54) MUDFLAP BRACKET

(75) Inventors: Timothy R. Hawes, Muskegon, MI (US); Wesley K. Eklund, Muskegon, MI (US)

(73) Assignee: Fleet Engineers, Incorporated, Muskegon, MI (US)

( * ) Notice: Subject to any disclaimer, the term of this patent is extended or adjusted under 35 U.S.C. 154(b) by 0 days.

(21) Appl. No.: 09/738,525

(22) Filed: Dec. 15, 2000

(65) Prior Publication Data

US 2002/0020794 A1 Feb. 21, 2002

Related U.S. Application Data

(60) Provisional application No. 60/173,589, filed on Dec. 29, 1999.

(51) Int. Cl.$^7$ ................................................. A47F 5/00
(52) U.S. Cl. ...................... 248/309.1; 280/848; 280/851
(58) Field of Search ............................. 248/309.1, 610, 248/611, 612, 613, 222.11, 225.11, 562, 570, 219.1, 219.3, 219.4, 227.3, 634, 636, 255, 254, 263, 262, 267; 280/848, 851, 847, 154.5

(56) References Cited

U.S. PATENT DOCUMENTS

| | | | |
|---|---|---|---|
| 2,801,867 A | 8/1957 | Childreth ................. 280/154.5 |
| 3,224,791 A | 12/1965 | Sogoian ................... 280/154.5 |
| 3,401,953 A | 9/1968 | Prohl et al. .............. 280/154.5 |
| 3,782,757 A * | 1/1974 | Juergens .................. 280/154.5 |
| 3,940,165 A | 2/1976 | Sogoian ............... 280/154.5 R |
| 3,954,281 A | 5/1976 | Juergens .............. 280/154.5 R |
| 3,966,222 A * | 6/1976 | Felburn ..................... 267/20 A |
| 3,999,776 A | 12/1976 | Betts, Sr. ............. 280/154.5 R |
| 4,165,092 A | 8/1979 | Herlein ................ 280/154.5 R |
| 4,189,165 A | 2/1980 | Leonard et al. ....... 280/154.5 R |
| 4,195,715 A * | 4/1980 | Nadherny ................... 188/210 |
| 4,352,502 A | 10/1982 | Leonard et al. ....... 280/154.5 R |
| 4,518,171 A * | 5/1985 | Hedenberg .................. 280/711 |
| 4,691,402 A * | 9/1987 | Veselka ......................... 15/87 |
| 4,712,805 A * | 12/1987 | McMillen ................ 280/154.5 |

(List continued on next page.)

OTHER PUBLICATIONS

Author unknown, Mack Trucks Service Sales Merchandiser parts catalog, date unknown, cover and two pages.
Authorn unknown, Fleetline parts catalog, date unknown, cover and pp. 10, 18 and 19.
Authorn unknown, Groen Metal Products parts catalog, date unknown, cover and pp. 18 and 19.

*Primary Examiner*—Ramon O. Ramirez
*Assistant Examiner*—A. Joseph Wujciak, III
(74) *Attorney, Agent, or Firm*—McGarry Bair PC (57) ABSTRACT

A spring-biased mudflap bracket assembly includes a hollow tube with a mounting plate at a proximate end and a frame seat mating to the mounting plate and yieldably biased into contact with the mounting plate by a spring mounted at one end within the hollow tube and to the frame seat at another end. A vibration-absorbing gasket can be mounted on an outer surface of the frame seat to abut the vehicle frame. A double-headed bolt mounts the spring to the hollow tube. The frame seat has three apertures in alignment, a central one of the apertures having a spacing to an upper aperture different than a spacing to a lower aperture, and a pair of mounting fasteners are received in two of the three apertures for mounting the frame seat to a vehicle frame. A concave perimetrical channel in the frame seat mates with a complementary convex annular projection on the mounting plate to form a pivot socket for the mounting plate with respect to the frame seat. The hollow tube has at least one sidewall including a longitudinal recess in an exterior surface thereof a conspicuity reflector is mounted in the longitudinal recess. The mounting plate has a tube-engaging wall which extends into the hollow tube and supports the proximate end of the hollow tube.

24 Claims, 5 Drawing Sheets

U.S. PATENT DOCUMENTS

| | | | |
|---|---|---|---|
| 4,726,599 A | 2/1988 | Antekeier et al. | 280/154.5 R |
| 4,877,267 A | 10/1989 | Leonard | 280/848 |
| 4,960,294 A | 10/1990 | Leonard | 280/848 |
| 5,265,896 A * | 11/1993 | Kravitz | 280/163 |
| 5,833,283 A * | 11/1998 | Shaw | 293/117 |
| 5,873,581 A * | 2/1999 | Yale | 280/5.519 |
| 6,302,502 B1 * | 10/2001 | Larsen, Jr. | 312/334.4 |
| 2001/0032914 A1 * | 10/2001 | Hawes | 248/299.1 |

* cited by examiner

MUDFLAP BRACKET

CROSS-REFERENCE TO RELATED APPLICATION

This application claims the benefit of U.S. provisional patent application Serial No. 60/173,589, filed Dec. 29, 1999.

BACKGROUND OF THE INVENTION

1. Field of the Invention

This invention relates to spring-biased brackets for resiliently mounting mudflaps to a vehicle frame. In one of its aspects, the invention relates to a mudflap mounting bracket formed of a hollow tube from sheet metal and including a mounting plate, a frame seat mating with the mounting plate and yieldably biased to the mounting plate through a spring mounted at one end within the hollow tube and at the other end to the frame seat. In another of its aspects, the invention relates to a mudflap mounting bracket with a vibration absorbing gasket for mounting between the frame seat and the vehicle frame. In another of its aspects, the invention relates to a mudflap mounting bracket which is adapted to mount to several different hole configurations in a vehicle frame. In another of its aspects, the invention relates to a mudflap mounting bracket in which a mudflap bracket is mounted in a frame bracket socket for pivotal movement. In another of its aspects, the invention relates to a mudflap mounting bracket which has a protected conspicuity reflector mounted thereto. In another of its aspects, the invention relates to a mudflap mounting bracket which has the same appearance on each side so that the bracket can be mounted to either side of the vehicle. In another of its aspects, the invention relates to a mudflap mounting bracket in which the tube wall, formed from sheet material, is reinforced at the inner end by the mounting plate.

2. Description of the Related Art

Mudflap brackets having a horizontal tube with a longitudinal mudflap mounting flange on its underside are known. Such brackets comprise a vehicle frame-mounted plate having bolts or studs of a predetermined, fixed separation, often selected to match existing manufacturer provided apertures in the vehicle frame. A proximate end of the horizontal tube is held against the frame-mounted plate, generally in an abutting relationship, by the bias of an elongate spring residing in the tube, the spring connected at one end to the frame-mounted plate and at the other end to the tube, at a location on the tube distal from the vehicle frame. Other prior art embodiments include a mounting plate fastened to the proximate end of the tube, such as by brazing or welding, the tube abutting the flat mounting plate. The mounting plate will generally include a central aperture to allow passage of the spring from the interior of the tube to the frame-mounted plate.

The abutting relationship of the horizontal tube and mounting plate to the frame-mounted plate often results in misalignment of the tube, which occurs when the tube is struck or subjected to the forces experienced by the vehicle travelling down the road. The bias of the elongate spring often cannot overcome the misalignment by itself. Comers or edges between the mounting plate, or tube, and the frame-mounted plate catch or hang up on each other, preventing realignment of the tube.

The advent of regulations requiring the addition of conspicuity markers to over-the-road trucks has prompted truck owners and manufacturers to devise ways to provide the required markers on their truck. These solutions include modifying the mudflap brackets to provide additional room for conspicuity markers, providing adapters to attach to the mudflap brackets and carry the conspicuity markers, and taking self-adhesive conspicuity tape such as a retroreflective tape and plastering it over the existing mudflap bracket. These installations can look sloppy, and usually provide minimal protection to the conspicuity markers, resulting in a loss of effectiveness and useful life, thereby increasing cost and maintenance time.

It would be advantageous to provide a mudflap bracket that can overcome the disadvantages of the prior art brackets in the alignment of the mudflap bracket when subjected to a displacing load. It would further be advantageous to provide mudflap brackets properly configured to provide conspicuity markers that are properly located and protected to help truck owners comply with the law while increasing the effective life of those markers by properly protecting them from damage.

SUMMARY OF THE INVENTION

According to the invention, a spring-biased mudflap bracket assembly includes a hollow tube with a mounting plate at a proximate end and a frame seat mating to the mounting plate and yieldably biased into contact with the mounting plate by a spring mounted at one end within the hollow tube and to the frame seat at another end. Optionally, a vibration-absorbing gasket is mounted on an outer surface of the frame seat and adapted to abut the vehicle frame when the bracket assembly is mounted to a vehicle frame.

In one embodiment, the outer surface of the frame seat has a recess and the vibration-absorbing gasket is positioned in the recess. The vibration-absorbing gasket is preferably annular. Further, at least one fastener is mounted to the frame seat and projects through the open central portion of the annular gasket.

In another embodiment, the frame seat has three apertures in vertical alignment. A central one of the apertures has a spacing to an upper aperture different than a spacing to a lower aperture. A pair of mounting fasteners are received in two of the three apertures for mounting the frame seat to a vehicle frame. Preferably, the three apertures are threaded and the mounting fasteners are threadably received in two of the three apertures. The fasteners can be studs or bolts.

In yet another embodiment, a concave perimetrical channel in the frame seat mates with a complementary convex annular projection on the mounting plate. The concave perimetrical channel is preferably arcuate in cross section and forms a socket for the mounting plate when the mounting plate rotates with respect to the frame seat. The frame seat has a central portion that extends axially of the concave perimetrical channel and into the mounting plate, and the central portion includes an eye which extends into the hollow tube.

In a preferred embodiment, the hollow tube has at least one sidewall including a longitudinal recess in an exterior surface thereof and a conspicuity reflector mounted in the longitudinal recess. In one embodiment, the vertical face of the hollow tube tapers in height from the proximate end to a distal end. In another embodiment, the vertical face of the hollow tube is substantially uniform in height from the proximate end to the distal end. In another embodiment, a distal portion of the tube is displaced downwardly at an angle from the generally horizontal proximate portion of the tube.

In a further embodiment, the hollow tube has opposing vertical faces, each face having a longitudinal recess and a conspicuity reflector mounted in the longitudinal recess, the recess being defined by an overhanging brow and an underlying sill.

In another embodiment, a double-headed bolt mounts the spring to the hollow tube. The hollow tube comprises opposing sidewalls, the double-headed bolt passing through aligned apertures in the opposing sidewalls. The double-headed bolt comprises heads presenting a substantially identical appearance on outer surfaces of the sidewalls of the hollow tube.

In still another embodiment, the mounting plate has a tube-engaging wall which extends into the hollow tube and supports the proximate end of the hollow tube. The tube-engaging wall bears against an inner surface of the hollow tube and the mounting plate is secured to the hollow tube by welding or embossing.

DESCRIPTION OF THE PREFERRED EMBODIMENT

Figures 1, 2:
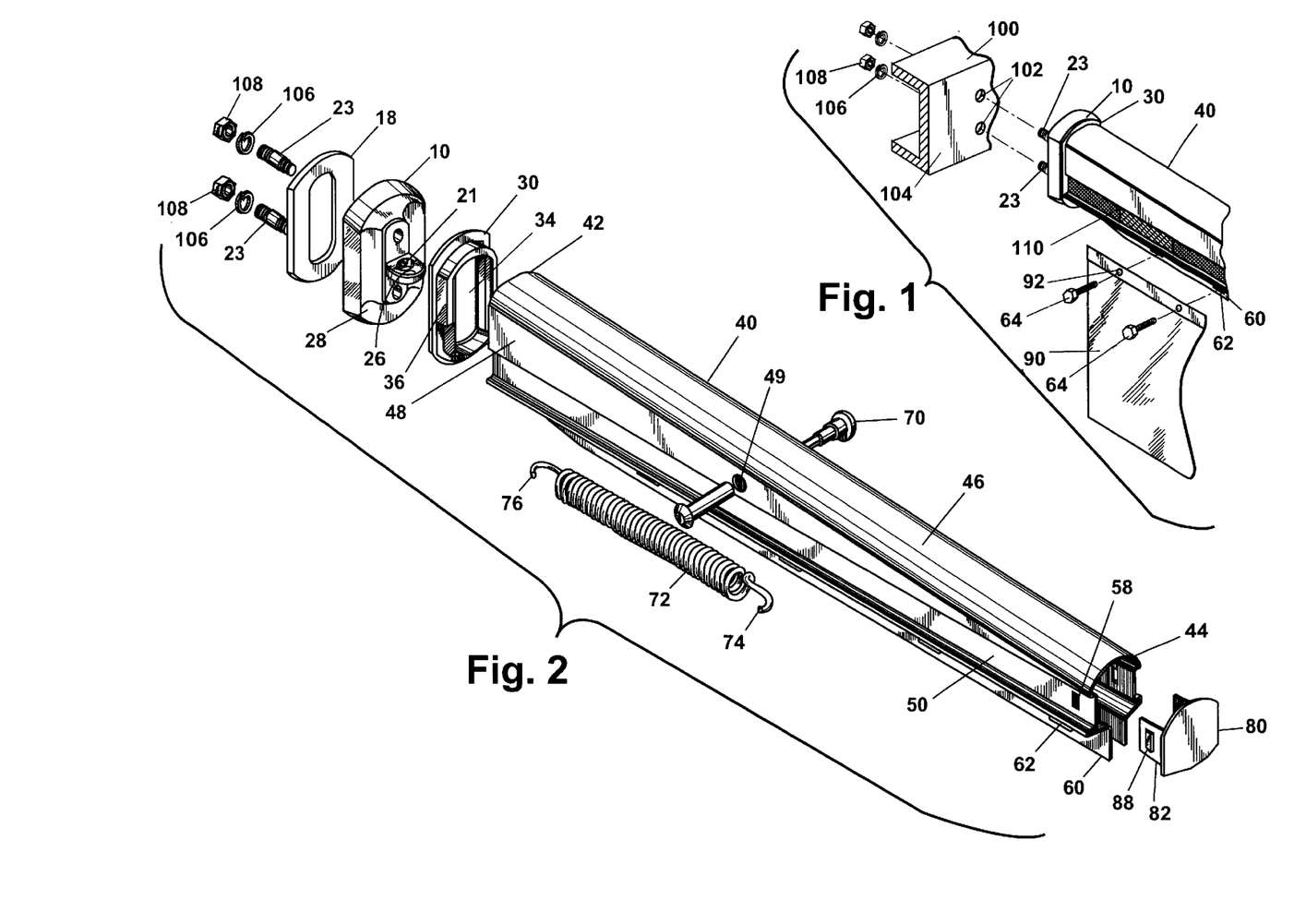
FIG. 1 is an exploded perspective partial view of a spring-biased mudflap bracket according to the invention and its relationship to a vehicle frame.
FIG. 2 is an exploded perspective view of the spring biased mudflap bracket according to the invention.

Referring to FIG. 1, a spring-biased mudflap bracket according to the invention is adapted to be mounted to a vehicle frame 100 having a vertical face 104, the face 104 having a plurality of apertures 102 passing therethrough. While typical vehicle frames 100 have apertures 102 pre-drilled in a vertical orientation, it is anticipated that the mudflap bracket according to the invention can be adapted to other orientations of apertures 102 in vehicle frame 100.

The bracket comprises a frame seat 10 for mounting to the vehicle frame 100. Frame seat 10 is secured to vehicle frame 100 by a pair of mechanical fasteners passed through apertures 102. In the preferred embodiment depicted, the mechanical fasteners comprise a pair of threaded studs 23 attached to frame seat 10 and spaced and adapted to align with the apertures 102 in the vehicle frame 100. Frame seat 10 is then secured to vehicle frame 100 by a pair of lock washers 106 and nuts 108 threadably received on studs 23.

The mudflap bracket further comprises a mudflap bracket tube 40 and an associated mounting plate 30 that serves as an interface between the tube 40 and the frame seat 10. The tube 40 comprises a mudflap mounting flange 60 to which a mudflap 90 can be mounted by the securing of mudflap mounting bolts 64 through mudflap mounting flange slots 62 and mudflap apertures 92. The tube 40 further has at least one conspicuity reflector such as reflex reflector 110 mounted along the length thereof.

Referring now to FIG. 2, the mudflap bracket further comprises an intervening gasket 18, which would be mounted between the frame seat 10 and the vehicle frame 100. The mudflap bracket tube 40 further comprises a spring retaining bolt 70 and an elongate tension spring 72, and an end cap 80.

The assembly comprising the tube 40 and mounting plate 30 is retained against the frame seat 10 by the elongate tension spring 72 that extends longitudinally within the tube 40. The spring 72 has at each of its ends first and second hook-like members 74, 76. The first hook-like member 74 is retained inside the tube 40 by the spring retaining bolt 70 that passes through apertures 49 in side faces 48 of the tube 40. The second hook-like member 76 is retained by an integral eye 26 of the frame seat 10. Tension force in the elongate spring 72 draws the tube 40 with its attached mounting plate 30 against the frame seat 10 such that a convex annular perimeter 32 (see FIG. 7) of the mounting plate 30 nests in a concave perimetrical channel 28 of the frame seat 10.

Figure 3:
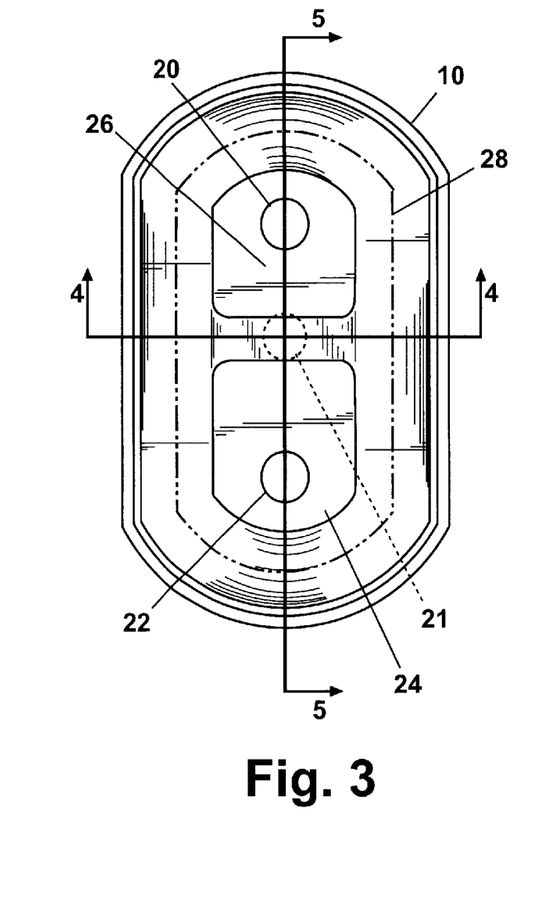
FIG. 3 is a plan view of a frame seat according to the invention.
Figure 4:
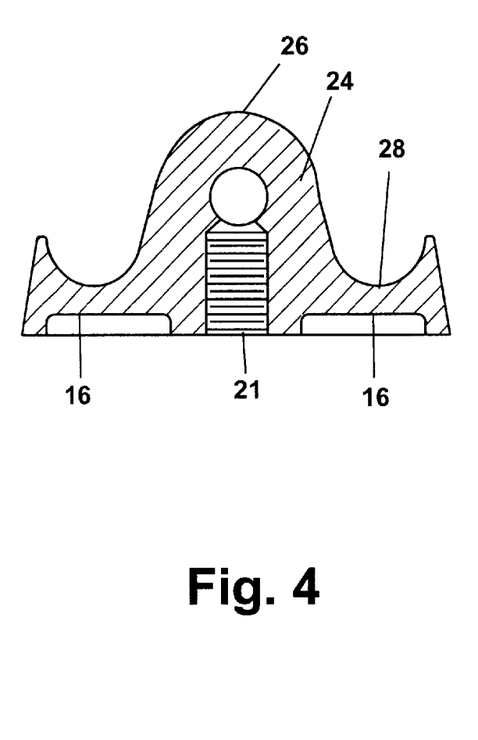
FIG. 4 is a cross-sectional view taken through line 4—4 of FIG. 3.
Figure 5:
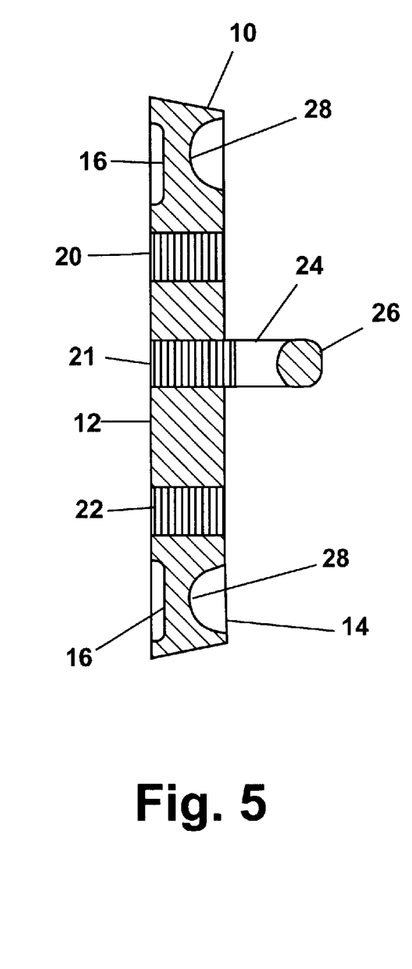
FIG. 5 is a cross-sectional view taken through line 5—5 of FIG. 3.

Referring to FIGS. 3–5, starting with the plan view of FIG. 3, the frame seat 10 is generally oval. As further shown in the cross-sectional views of FIGS. 4 and 5, the frame seat comprises a first side 12 that is generally flat to mate with the vehicle frame 100, the first side 12 having an annular recess 16 for receiving the gasket 18. The gasket 18 serves as a moisture seal and vibration reducer between the frame seat 10 and the vehicle frame 100.

The first side 12 of the frame seat 10 also carries three aligned threaded apertures 20, 21, 22, each adapted to receive one threaded stud 23. The three threaded apertures 20, 21, 22 are spaced such that two of the three apertures 20, 21, 22 will align with the various common aperture spacings found in vehicle frames 100.

The second side 14 of the frame seat 10 has a central raised portion 24 that comprises an integral eye 26. In the illustrated embodiment, the threaded aperture 21 is aligned with the integral eye 26, while the threaded apertures 20, 22 align with the raised portion 24 outside the area defining the integral eye. A concave perimetrical channel 28 surrounds the central raised portion 24.

Figure 6:
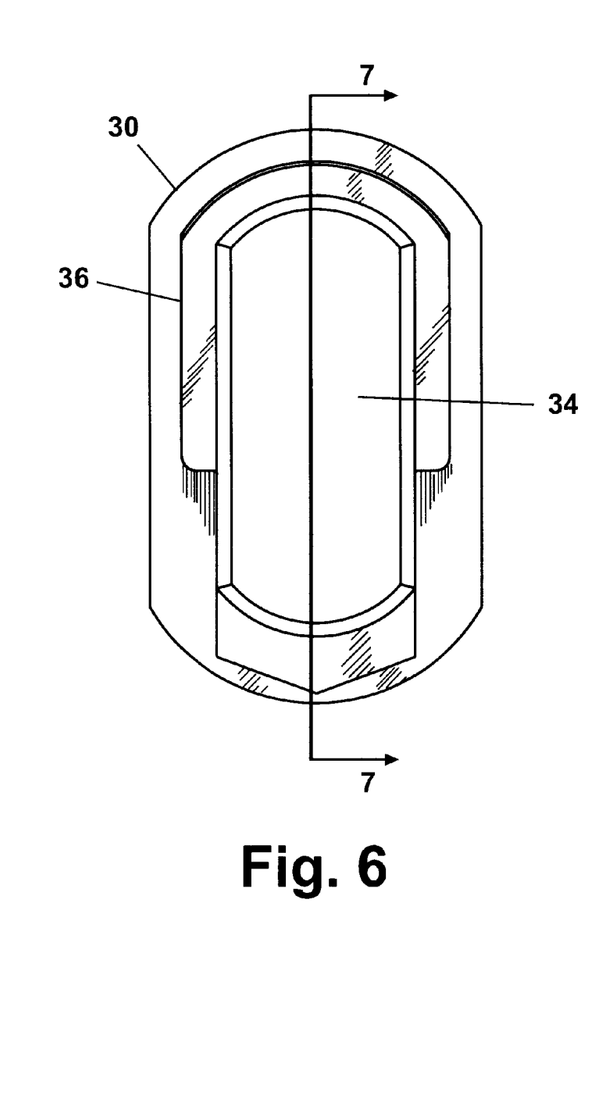
FIG. 6 is a plan view of a mounting plate according to the invention.
Figure 7:
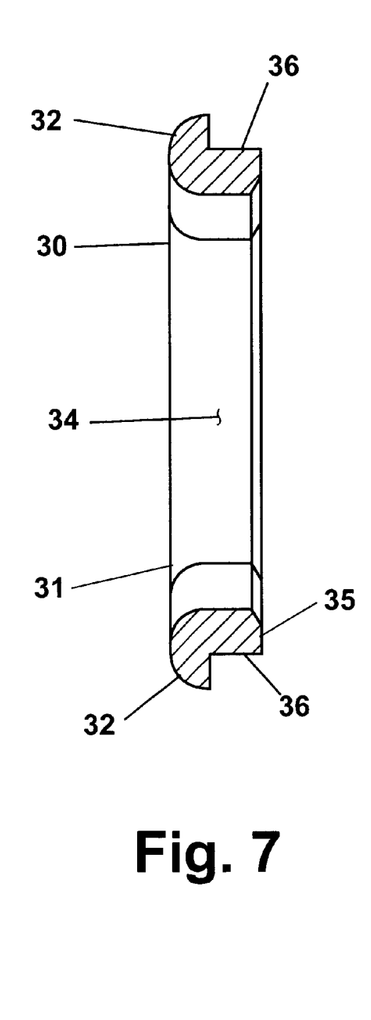
FIG. 7 is a cross-sectional view taken through line 7—7 of FIG. 6.

The mounting plate 30, shown in detail in FIGS. 6 and 7, is generally annular in plan view and is generally oval to match the frame seat 10. The mounting plate 30 comprises a first side 31 and a second side 35. The first side 31 comprises a convex annular perimeter 32 adapted to flushly mate with the concave perimetrical channel 28 of the frame seat 10. A second side 35 includes an upstanding tube-engaging wall 36. In the preferred embodiment shown, the perimeter of the wall 36, as shown in plan view in FIG. 6, is adapted to match with the inner cross section of the tube 40 (see FIG. 9), so that the wall 36 fully supports the tube 40 at proximate end 42. It is anticipated that the mounting plate 30 can be further adapted to engage the outer surface of the tube 40. The mounting plate 30 further comprises a central aperture 34 sized to receive the central raised portion 24 of the frame seat 10, including the integral eye 26 of the frame seat 10, when the convex annular perimeter 32 is received in the concave perimetrical channel 28 of the frame seat 10.

Figure 8:
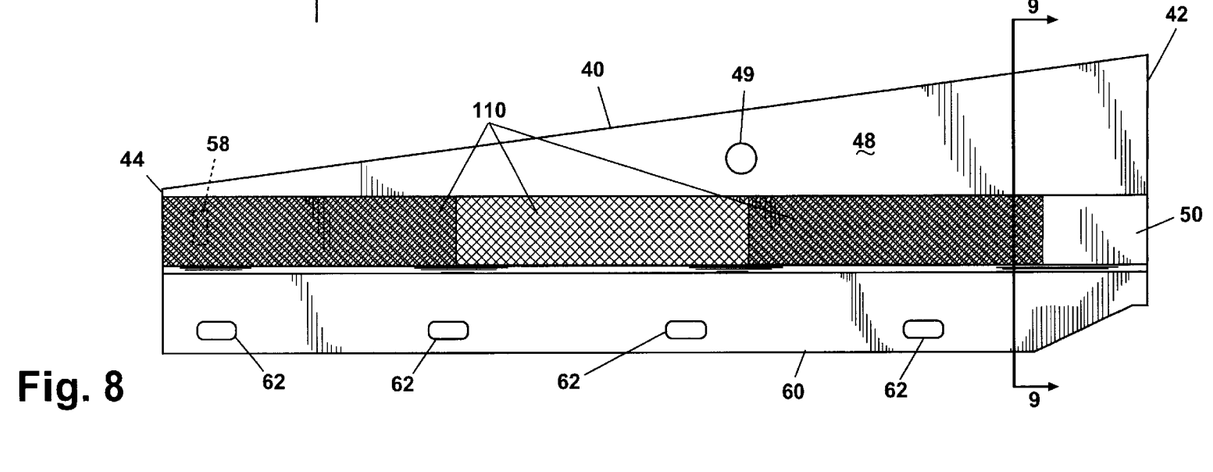
FIG. 8 is a side view of an elongate mudflap bracket tube according to the invention.
Figure 9:
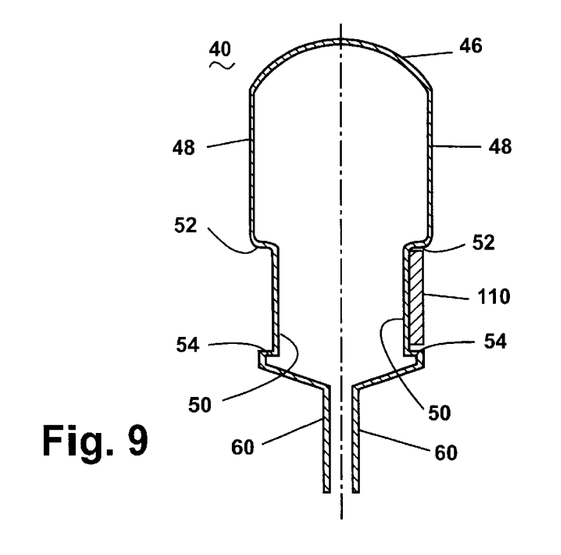
FIG. 9 is a cross-sectional view taken through line 9—9 of FIG. 8.

Referring now to FIGS. 8 and 9, the tube 40 of the mudflap bracket is constructed of a stamped sheet metal and has a proximate end 42 with a cross section adapted to closely correspond to the tube-engaging wall 36 of the mounting plate 30. The wall 36 provides strength to the tube 40 at proximate end 42. The tube 40 can be permanently mounted to the mounting plate 30, such as by welding, embossing, or other well known bonding or mechanical methods.

In the cross-sectional view of FIG. 9, the tube 40 is symmetrical about a vertical centerline and can thus be mounted to either side of the vehicle and have the same appearance. The tube includes an arched top 46 and two downwardly projecting side faces 48. Each of the side faces 48 includes a recess 50 and a mudflap mounting flange 60. Each of the side faces 48 is bent inwardly at approximately one third the distance from the arched top 46 to form a brow 52, the brow 52 marking the upper boundary of the recess 50. The lower boundary of the recess 50 is defined by a sill 54 formed by an outward bending of the side face 48. The side face 48 is finally bent inwardly and then downwardly to terminate in the mudflap mounting flange 60. A reflector 110 is shown installed in one of the recesses 50, for installation on the left side of a vehicle with the reflector 110 facing to the rear of the vehicle. In the alternative, reflector 110 would be installed in the opposite recess 50 for installation on the right side of a vehicle.

As shown in FIG. 8, the tube 40 tapers in height from the proximate end 42 to a distal end 44, the tapering being accomplished by a reduction in the height of the side faces 48 above the recess 50. The recesses 50 and mudflap mounting flanges 60 remain substantially uniform in height. The mudflap mounting tube 40 remains symmetrical in cross section as it decreases in overall height from the proximate end 42 to the distal end 44.

Each of the side faces 48 has an aperture 49, the aperture 49 of each side face 48 aligned with the aperture 49 in the opposing side face 48. The apertures 49 are for receiving the spring retaining bolt 70 therethrough. Referring back to FIG. 2, the bolt 70 has a double-headed bolt having opposing identical heads and telescoping shafts which are threadably joined together through the apertures 49 for a flush mounting against each of the side faces 48. The bracket can thus be mounted to either side of the vehicle and maintain the same appearance.

The mudflap mounting flanges 60 comprise a series of aligned mudflap mounting flange slots 62. The separation between the mudflap mounting flanges 60 is such that a mudflap 90 can be closely inserted between the mounting flanges 60, with mudflap apertures 92 in the mudflap 90 aligned with the mudflap mounting flange slots 62.

The recess 50 of each side face 48 has a slot 58 proximate the distal end 44 of the tube 40. An end cap 80 for covering the distal end 44 of tube 40 comprises two flanges 82 adapted to pass to the interior of the tube 40. Each of the flanges 82 includes a detent 88 protruding therefrom such that when the flanges 82 are inserted to the inside of the tube 40 at distal end 44, the detents 88 project outwardly. The flanges resiliently direct the detents 88 into the slots 58 to hold the end cap 80 in place on the distal end 44 of tube 40.

Figure 10:
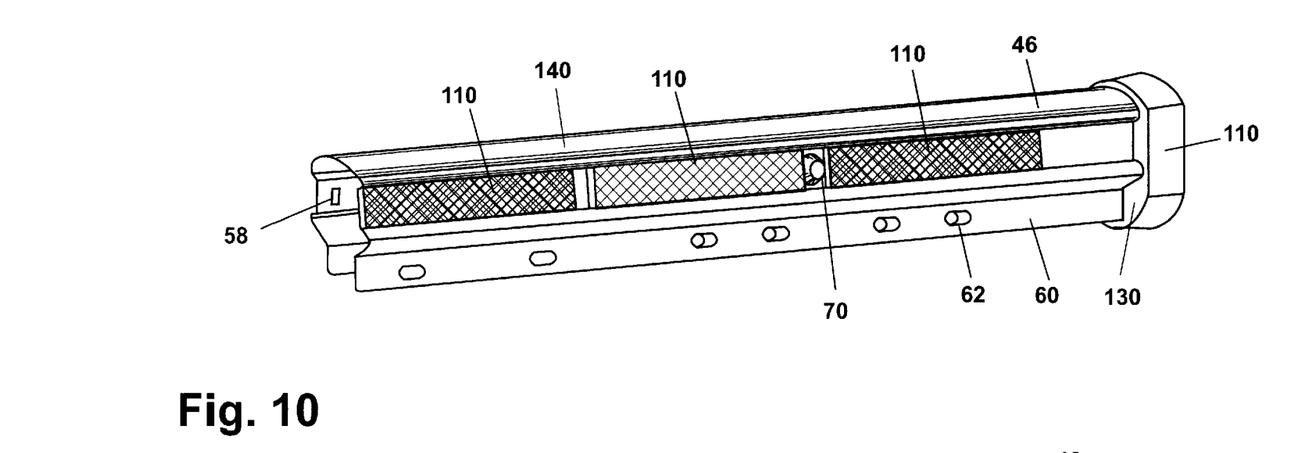
FIG. 10 is a further embodiment of a spring-biased mudflap bracket according to the invention.
Figure 11:
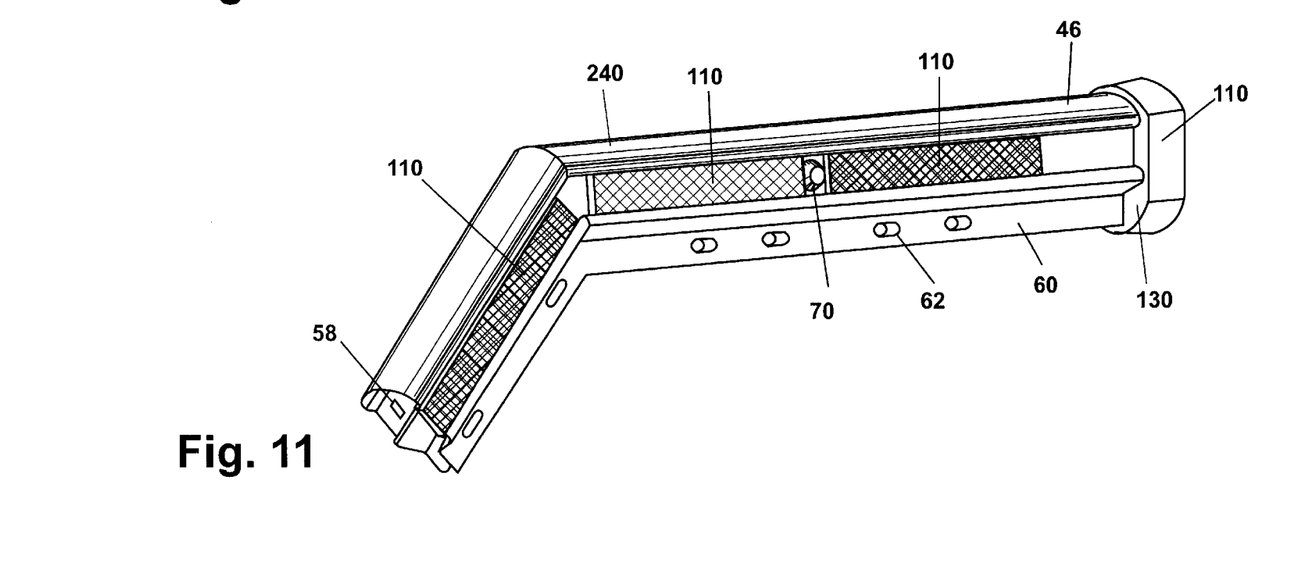
FIG. 11 is a further embodiment of a spring-biased mudflap bracket according to the invention.

Alternative embodiments of the spring-biased mudflap bracket according to the invention are depicted in FIGS. 10 and 11. Each embodiment is substantially similar to the first embodiment of the invention, in that they each comprise a frame seat 10 and mounting plate 30 as disclosed in FIGS. 3–7. The mounting plate 30 of the first embodiment is modified in that the profile of the tube-engaging wall 36 is modified to match the cross section of the alternative embodiment of the mudflap bracket tubes 140, 240 of FIGS. 10 and 11, respectively. In particular, the depending portion of the side faces 48 of the first embodiment have been eliminated, so that the arched top 46 of the tubes 140, 240 transitions directly into the brow 52 defining the upper limit of the recess 50. The cross section of the tubes 140, 240 is therefore substantially uniform throughout the length of the tubes 140, 240, rather than the tapered cross section of the tube 40 of the first embodiment.

The embodiments of FIGS. 10 and 11 use tubes 140, 240, having substantially the same cross section. The tube of FIG. 10 is substantially straight, having a uniform cross section, while the embodiment of FIG. 11 utilizes a tube 240 having the outer approximate one-third of the tube 240 bent downwardly at an angle to provide clearance where a straight tube would interfere with other parts of the structure of the vehicle.

Installation

An installer is provided with a substantially assembled mudflap bracket according to the invention. The tube 40 and mounting plate 30 are held to the frame seat 10 by the elongate tension spring 72, the spring 72 in tension between the spring retaining bolt 70 and the integral eye 26 of the frame seat 10. At least one reflector 110 can come preinstalled in a recess 50 of a side face 48 of the tube 40, corresponding to a right or left side installation on the vehicle. In the alternative, the reflector 110 can be placed by the on-site installer into the proper recess 50 to correspond to the side of the vehicle. In a further alternative, reflectors 110 can be preinstalled in both recesses 50 for universal installation of a mudflap bracket according to the invention on either side of a vehicle.

Upon receipt of the assembly, the installer will insert threaded studs 23 into the appropriate threaded apertures 20, 21, 22 on the first side 12 of the frame seat 10, to match the apertures 102 available in the vehicle frame 100. The studs 23 will have an interference relationship with the threaded apertures 20, 21, 22 of the frame seat 10, such that the threads of the stud 23 will bind in the selected apertures 20, 21, 22. In the alternative, the installer will pass bolts (not shown) through the apertures 102 of the vehicle frame 100 so that they extend from the frame face 104.

The installer will then place the frame seat gasket 18 in the annular recess 16 on the first side 12 of the frame seat 10, and place the frame seat 10 against the vehicle frame 100 so that the studs 23 pass through apertures 102 in the vehicle frame 100. The vehicle frame 100, in this preferred embodiment, has a substantially vertical face 104 available for mounting the mudflap bracket. The installer will then secure the mudflap bracket with a lock washer 106 and nut 108. The mudflap bracket, being symmetrical about the vertical centerline, is universal in application to either the right or the left side of the vehicle frame 100.

Once in place, the mudflap bracket can receive a mudflap 90 between the mudflap mounting flanges 60, as described above. A mudflap mounting bolt 64 can then be inserted through the mudflap mounting flange slots 62 and the apertures 92 in the mudflap 90 to retain the mudflap 90 between the mudflap mounting flanges 60. End cap 80 is usually then installed at the distal end 44 of the tube 40.

Operation

In use, the mudflap bracket will maintain a generally horizontal orientation. The elongate tension spring 72 is of sufficient strength to maintain the horizontal orientation under the combined weight of the mudflap 90 and mudflap bracket. When the mounting plate 30 is displaced from its generally aligned orientation with the frame seat 10, such as when the mudflap 90 or mudflap bracket is struck, or when the mudflap bracket bounces out of alignment due to irregularities in the road surface transferred to the vehicle frame 100, the elongate spring 72 will return the mounting plate 30 to its aligned orientation with the frame seat 10. The spring 72 is assisted in reaching this objective by the self aligning properties of the mounting plate 30 and the frame seat 10, specifically the convex annular perimeter 32 of the mounting plate being urged by the elongate tension spring 72 back into the concave perimetrical channel 28 of the frame seat 10. The absence of sharp edges or corners in the interface between the frame seat 10 and the mounting plate 30 helps to ensure that the mounting plate 30 readily aligns itself with the frame seat 10.

Each of the recesses 50 in the side faces 48 of the tube 40 provides a flat, uninterrupted mounting surface, with the minor exception of the slot 58 proximate the distal end 44, as described above. This flat mounting surface is sized to receive a reflex reflector 110 of a specified length and width. Reflex reflector 110 is necessary to provide extra conspicuity for the vehicle, and is provided by such reflex reflector products as those produced by STATE-LITE. Reflex reflector 110 installed in recess 50 is advantageously protected along its upper and lower edges by the brow 52 and sill 54 respectively, resulting in a neat installation that will require a minimum of maintenance of the conspicuity reflector.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is described in the appended claims.

What is claimed is:

1. A spring-biased mudflap bracket assembly including a hollow tube with a mounting plate at a proximate end, a frame seat mating to the mounting plate and yieldably biased into contact with the mounting plate by a spring mounted at one end within the hollow tube and to the frame seat at another end, and a vibration-absorbing gasket mounted on an outer surface of the frame seat and adapted to abut the vehicle frame, the improvement comprising:
   the outer surface of the frame seat has a recess and the vibration-absorbing gasket is positioned in the recess.

2. The assembly of claim 1, wherein the gasket is annular and further comprising at least one fastener mounted to the frame seat and projecting through the open central portion of the annular gasket.

3. A spring-biased mudflap bracket assembly including a hollow tube with a mounting plate at a proximate end, a frame seat mating to the mounting plate and yieldably biased into contact with the mounting plate by a spring mounted at one end within the hollow tube and to the frame seat at another end, the improvement comprising:
   the frame seat having three apertures in alignment, a central one of the apertures having a spacing to an upper aperture different than a spacing to a lower aperture, and a pair of mounting fasteners received in only two of the three apertures for mounting the frame seat to a vehicle frame.

4. The assembly of claim 3, wherein the three apertures are in vertical alignment.

5. The assembly of claim 3, wherein the three apertures are threaded and the mounting fasteners are threadably received in two of the three apertures.

6. The assembly of claim 5, wherein the fasteners are studs.

7. The assembly of claim 5, wherein the fasteners are bolts.

8. The assembly of claim 3, wherein the fasteners are studs.

9. A spring-biased mudflap bracket assembly including a hollow tube with a mounting plate at a proximate end, a frame seat mating to the mounting plate and yieldably biased into contact with the mounting plate by a spring mounted at one end within the hollow tube and to the frame seat at another end, the improvement comprising:
   a concave perimetrical channel in the frame seat mating with a convex annular projection on the mounting plate complementary in shape to the concave perimetrical channel of the frame seat.

10. The assembly of claim 9 wherein the concave perimetrical channel is arcuate in cross section.

11. The assembly of claim 10 wherein the concave perimetrical channel forms a socket for the mounting plate when the mounting plate rotates with respect to the frame seat.

12. The assembly of claim 9 wherein the frame seat has a central portion that extends axially of the concave perimetrical channel and into the mounting plate, and the central portion includes an eye which extends into the hollow tube.

13. A spring-biased mudflap bracket assembly including a hollow tube with a mounting plate at a proximate end, a frame seat mating to the mounting plate and yieldably biased into contact with the mounting plate by a spring mounted at one end within the hollow tube and to the frame seat at another end, the improvement comprising:
   the hollow tube having at least one sidewall including a longitudinal recess in an exterior surface thereof; and
   a conspicuity reflector mounted in the longitudinal recess.

14. The assembly of claim 13, wherein the hollow tube has opposing sidewalls, each sidewall having a longitudinal recess and a conspicuity reflector mounted in the longitudinal recess.

15. The assembly of claim 13, wherein the recess is defined by an overhanging brow and an underlying sill.

16. A spring-biased mudflap bracket assembly including a hollow tube with a mounting plate at a proximate end, a frame seat mating to the mounting plate and yieldably biased into contact with the mounting plate by a spring mounted at one end within the hollow tube and to the frame seat at another end,
   the improvement comprising:
      the hollow tube having at least one sidewall including a longitudinal recess in an exterior surface thereof and wherein the sidewall tapers in height from the proximate end to a distal end; and
      a conspicuity reflector mounted in the longitudinal recess.

17. A spring-biased mudflap bracket assembly including a hollow tube comprising opposing sidewalls with a mounting plate at a proximate end, a frame seat mating to the mounting plate and yieldably maintained in contact with the mounting plate by a spring internally mounted at one end to the hollow tube and to the frame seat at another end,
   the improvement comprising:
      a double-headed bolt passing through aligned apertures in the opposing sidewalls and mounting the spring to the hollow tube.

18. The assembly of claim 17 wherein the double-headed bolt comprises heads presenting a substantially identical appearance on outer surfaces of the sidewalls of the hollow tube.

19. A spring-biased mudflap bracket assembly including a hollow tube with a mounting plate at a proximate end, a frame seat mating to the mounting plate and yieldably biased into contact with the mounting plate by a spring mounted at one end within the hollow tube and to the frame seat at another end, the improvement comprising:

the mounting plate having a tube-engaging wall which extends into the hollow tube and supports the proximate end of the hollow tube.

20. The assembly of claim 19, wherein the mounting plate is secured to the hollow tube by welding.

21. The assembly of claim 19, wherein the mounting plate is secured to the hollow tube by embossing.

22. The assembly of claim 19, wherein the tube-engaging wall bears against an inner surface of the hollow tube.

23. The assembly of claim 22, wherein the mounting plate is secured to the hollow tube by welding.

24. The assembly of claim 22, wherein the mounting plate is secured to the hollow tube by embossing.

* * * * *